United States Patent [19]

Cataldo

[11] 4,428,335
[45] Jan. 31, 1984

[54] ENGINE INTAKE PORT WITH ANNULAR NOZZLE DIRECTED SWIRL

[75] Inventor: Roy S. Cataldo, Birmingham, Mich.

[73] Assignee: General Motors Corporation, Detroit, Mich.

[21] Appl. No.: 332,170

[22] Filed: Dec. 18, 1981

[51] Int. Cl.³ .............................................. F02F 1/42
[52] U.S. Cl. ................................ 123/188 M; 123/306
[58] Field of Search ............... 123/188 M, 188 R, 306

[56] References Cited

U.S. PATENT DOCUMENTS

| | | | |
|---|---|---|---|
| 1,231,799 | 7/1917 | Simpson | 123/312 |
| 1,526,963 | 2/1925 | Chandler | 123/188 M |
| 1,859,329 | 5/1932 | De Lautour | 123/306 |
| 3,313,278 | 4/1967 | Thuesen | 123/310 |
| 3,823,702 | 7/1974 | Roberts | 123/188 M |

FOREIGN PATENT DOCUMENTS 1282159  12/1961  France ........................... 123/188 M

*Primary Examiner*—Craig R. Feinberg
*Assistant Examiner*—W. R. Wolfe
*Attorney, Agent, or Firm*—Robert J. Outland

[57] ABSTRACT

A flow directing annular nozzle inlet port for an internal combustion engine includes a tubular wall defining an open passage connecting with an associated engine combustion chamber and having a plurality of angularly disposed nozzles aligned in helical fashion to direct inlet fluid in a manner to define, supplement and reinforce a single lead pattern of helical flow in the open passage with a predetermined primary flow path leading to discharge into the cylinder in a primary flow direction determined by the primary flow path in the passage. To develop cylinder swirl, the discharge flow direction is preferably oriented circumferentially tangential to the cylinder wall.

3 Claims, 2 Drawing Figures

ENGINE INTAKE PORT WITH ANNULAR NOZZLE DIRECTED SWIRL

TECHNICAL FIELD

This invention relates to internal combustion engines and more particularly to combustion chamber swirl developing intake ports.

BACKGROUND

The generation of rotating movements or swirl in the cylinder intake charge of piston type internal combustion engines by inlet ports of various configurations has long been recognized in the engine art as a means of increasing turbulent flame speed, charge burn rate, combustion thermal efficiency and lean burn capability as well as having other advantages. Various forms of swirl generating inlet configurations have been proposed, among which are masked or shrouded valves, angled or directed ports, helical ports and directed ports with deflector walls or blades of various shapes.

SUMMARY OF THE INVENTION

The present invention proposes a novel configuration for an engine inlet port arranged to provide helical or spiral flow in the port oriented to direct outlet flow in a desired preferential direction, such as tangential to the cylinder wall, to provide cylinder swirl. The novel construction interposes in the inlet port a nozzle containing flow annulus section between two sections of open flow piping. Preferably the two open sections comprise the engine intake manifold or an extension thereof in the cylinder head and the valve chamber.

The flow annulus section is formed by blocking the central portion of the open flow section to define a surrounding annulus sized to allow negligible pressure drop. Connection from the annulus section to the inlet of the valve chamber, which comprises the outlet of the open pipe section, is made through two or more nozzles. These may be circular, rectangular, or of other suitable configuration and are directed tangentially into the outlet open section with appropriate lead angles to form a spiraling flow pattern in the outlet section. The nozzles are appropriately located so that the patterns of flow from the individual nozzles are aligned or closely adjacent so as to maintain and reinforce flow along a defined path having the desired lead angle of the spiral. The distance from the final nozzle to the port outlet at the engine cylinder is selected so that the spiraling pattern of air exits in the desired direction, such as tangential to the cylinder wall, to form a swirl pattern in the cylinder.

By selection of efficient nozzle configurations with high flow coefficients and by provision of a sufficient number and cross-sectional area of nozzles connecting between the annular inlet and outlet open pipe flow areas, the swirl port may be designed for high swirl with minimal flow loss. Possible advantages of the swirl port design include compact and symmetrical design if desired, a high overall flow coefficient, the capability for providing a high degree of cylinder swirl, flexibility of location at a distance from the valve chamber due to the laws of conservation of momentum and flexibility with regard to location of the annular nozzles at various circumferential locations or along one side of the open flow outlet pipe if desired.

These and other features and advantages of the invention will be more fully understood from the following description of a selected embodiment chosen for purposes of illustration taken together with the accompanying drawing.

BRIEF DRAWING DESCRIPTION

In the drawing:

FIG. 1 is a fragmentary cross-sectional view along the line 1—1 of FIG. 2 through a portion of a cylinder and inlet port of an internal combustion engine having annular nozzle swirl generating means in accordance with the invention, and FIG. 2 is a cross-sectional view through the port taken generally in the plane indicated by the line 2—2 of FIG. 1.

DETAILED DESCRIPTION

Figure 1:
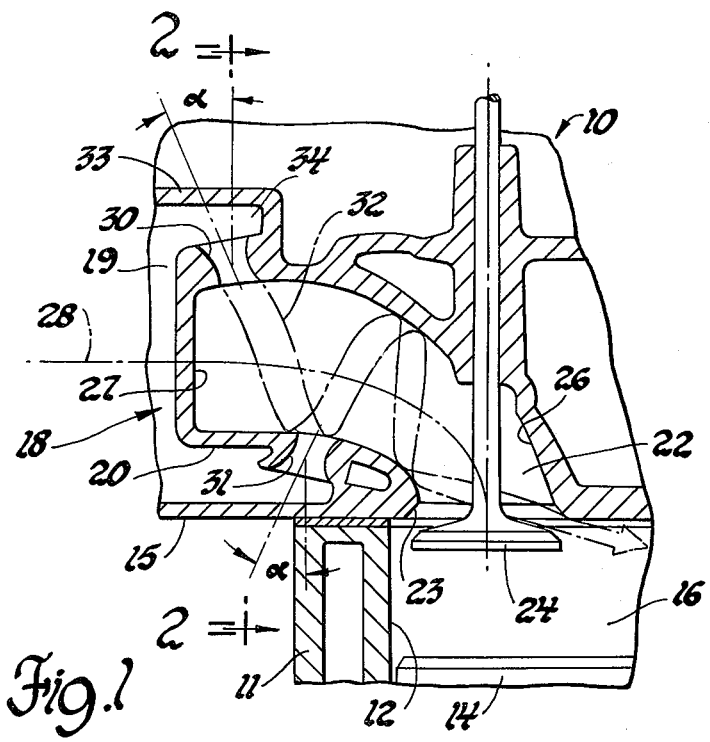
Figure 2:
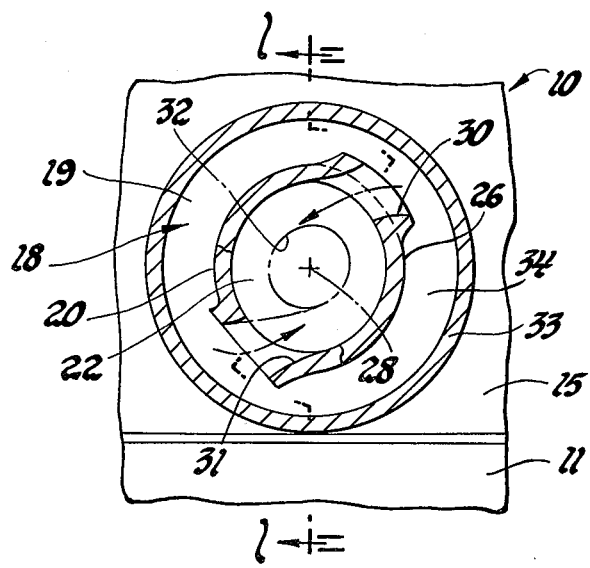

Referring now to the drawing in detail, numeral 10 generally indicates a piston type internal combustion engine having a cylinder block 11 defining at least one cylinder 12 in which there is reciprocably disposed a piston 14. A cylinder head 15 is mounted on the cylinder block so as to close the end of each cylinder 12, defining therewith and with the associated piston a variable volume combustion chamber 16.

Within the cylinder head, there is defined a flow directing inlet port generally indicated by numeral 18 and comprised essentially of three sections: an inlet section 19, a central annular section 20 and an outlet or valve chamber section 22. At one end of the outlet section, the port opens to the combustion chamber 16 through a valve opening having a valve seat 23. A poppet valve 24 reciprocably carried in the cylinder head is seatable on the valve seat 23 to control in conventional fashion, communication of the inlet port 18 with the combustion chamber 16.

The outlet section of the port 18 is defined by a generally cylindrical tubular wall 26 that extends from the valve opening at 23, to an end wall 27 that closes the opposite end. The end wall 27 and the tubular wall 26, together define an open flow passage devoid of sharp bends but having an axis 28 describing a relatively smooth curvature of approximately 90° from its closed end at wall 27 to the opposite open end at the combustion chamber.

The end wall 27 and adjacent portions of the tubular wall 26 also define in part the annular section 20 of the inlet port 18. This section also includes a pair of flow directing nozzles 30, 31 formed in and extending through the tubular wall at axially and circumferentially spaced locations. Nozzle 30 is located near the closed end of the port outlet section and extends through the tubular wall 26 in a direction generally tangential with the cylindrical interior of the wall and lying at an angle $\alpha$ from a plane normal to the axis 28 of the open passage defined by the wall. Thus, intake air or mixture entering the open passage through the nozzle 30 is directed around the circumference of the passage interior in a primary flow path 32 having a helical pattern proceeding at the lead angle $\alpha$ axially of the passage to the open end of the port where it enters the combustion chamber.

Nozzle 31 is located in the tubular wall 26 with a similar tangential orientation and at the same angle $\alpha$ from a plane normal to the passage axis 28. In addition, nozzle 31 is located in a position of alignment with the flow path 32 of inlet fluids passing from the nozzle 30 helically along the interior of the passage defined by the tubular wall 26, so that flow through the nozzle 31 into the open passage supplements and reinforces the pattern of helical flow at the lead angle α of the fluid entering through the nozzle 30. The two bodies of fluid thus join in proceeding primarily in the generally helically pattern previously described toward and out through the end of the port into the combustion chamber.

Any number of nozzles more than one may be utilized in an inlet port according to the invention and such nozzles may be located at any suitable locations along the port tubular wall, including circumferentially opposed, axially aligned or radially spaced, which together define, supplement and reinforce a single lead pattern of helical flow of fluid within the passage having a predetermined primary flow path leading to discharge into the cylinder with a predetermined primary flow direction. Such nozzle arrangements may include not only direct alignment of the nozzles with the center of the flow path of the fluids, but also, if desired, arrangement of the nozzles with slightly offset relationships relative to the fluid flow path so that the body of helically flowing fluid is widened somewhat in an axial direction by supplemental flow from each of the various nozzles, located along the tubular wall.

A significant aspect of placement of the nozzles is, however, that the nozzles be so positioned and directed with respect to the open flow passage as to provide a main helical flow path 32 which terminates at the open outlet of the port into the combustion chamber with a predetermined location and direction of flow so as to obtain a desired flow pattern within the combustion chamber. Presumably, the most desirable direction would be along and essentially circumferentially tangential to the cylinder wall so that a high degree of swirl would be developed within the combustion chamber. However, any other suitable direction of outlet flow may be provided if desired by suitable location of the nozzles within the inlet port annular section.

The inlet section 19 of the port is defined in part by an annular wall 33 which surrounds in spaced relation the tubular wall 26 near its closed end at 27 to define an annular chamber 34 extending around the tubular wall. Chamber 34 communicates with the flow nozzles 30, 31 to direct inlet air or mixture thereto.

Upstream of the annular chamber, the inlet section defines an open passage which may be of suitably varied area and appropriate configuration for connection with an engine inlet manifold, not shown, through which the inlet air or air-fuel mixture is supplied. The cross-sectional area and configuration of the upstream portion of the passage may be selected as desired to minimize restriction to fluid flow into the annular chamber 34. In like manner, the number and cross-sectional area of the plural nozzles, such as 30, 31, utilized with the port should be chosen to provide an adequate volume of mixture flow without undue restriction thereof. In this regard, design of the nozzles in accordance with known criteria to obtain high flow coefficients and minimum pressure loss is desirable.

While the use of a flow directing annular nozzle inlet port of the type described is intended to provide a high degree of directed flow of the cylinder inlet charge to provide desirable swirl forming characteristics, it is anticipated that some percentage of the fluid directed by the nozzles into the outlet section of the port will depart from the primary helical flow path and move through the port in the adjacent portions thereof. Such fluid, it is expected, will enter the combustion chamber throughout the complete annulus created by opening of the inlet valve, thus providing for a minimum restriction to flow through the port. Nevertheless, the direction of flow by the nozzles of inlet fluid into a primary helical path should operate in accordance with the law of conservation of momentum to cause a significant portion of the fluid to follow the predetermined flow path and enter the combustion chamber in the predetermined primary flow direction so as to obtain the desired swirl developing effect.

While the invention has been described by reference to a specific embodiment chosen for purposes of illustration, numerous changes could be made within the spirit and scope of the inventive concepts disclosed. Accordingly, it is intended that the invention not be limited to the disclosed embodiment but that it have the full scope permitted by the language of the following claims.

The embodiments of the invention in which an exclusive property or privilege is claimed are defined as follows.

1. A flow directing inlet port for an internal combustion engine having a cylinder closed at one end, said port comprising
   a tubular wall defining an open passage devoid of sharp bends and extending at one end through said cylinder closed end to an annular valve seat, the other end of said passage being closed by an end wall,
   a poppet valve having a head seatable on the valve seat to close the passage against communication with the cylinder and a stem extending into the passage from the head and through one of said passage walls for reciprocably supporting the valve head for movement into open and closed positions,
   a plurality of inlet nozzles extending through the walls of said passage and comprising the sole means for conducting primary inlet fluid into said passage, said nozzles being directed generally tangentially of the interior of the tubular passage defining wall and offset at a predetermined lead angle toward the cylinder end of the passage with respect to planes normal to the passage axis so as to direct fluid flow into the passage in a helical flow pattern within the passage having a spiral lead angle substantially determined by the lead angle of the nozzles, all of said nozzles being offset longitudinally of the passage and so located as to direct flow into substantially the same helical path within the passage to define, supplement and reinforce a single lead pattern of helical flow in the passage having a predetermined primary flow path leading to discharge into the cylinder with a predetermined primary flow direction determined by the primary flow path in the passage, and
   fluid supply means connecting with the nozzles to supply primary inlet fluid thereto for delivery to the inlet port and thereby to the cylinder.

2. A flow directing inlet port for an internal combustion engine having a cylinder closed at one end, said port comprising
   a tubular wall defining an open passage of substantially circular cross section, devoid of sharp bends and extending at one end through said cylinder closed end to an annular valve seat, the other end of said passage being closed by an end wall,
   a poppet valve having a head seatable on the valve seat to close the passage against communication with the cylinder and a stem extending into the passage from the head and through one of said passage walls for reciprocably supporting the valve head for movement into open and closed positions, a plurality of inlet nozzles extending through the walls of said passage and comprising the sole means for conducting primary inlet fluid into said passage, said nozzles being directed generally tangentially of the interior of the tubular passage defining wall and offset at a predetermined lead angle toward the cylinder end of the passage with respect to planes normal to the passage axis so as to direct fluid flow into the passage in a helical flow pattern within the passage having a spiral lead angle substantially determined by the lead angle of the nozzles, all of said nozzles being offset longitudinally of the passage and so located as to direct flow into substantially the same helical path within the passage to define, supplement and reinforce a single lead pattern of helical flow in the passage having a predetermined primary flow path leading to discharge into the cylinder with a predetermined primary flow direction determined by the primary flow path in the passage, and fluid supply means connecting with the nozzles to supply primary inlet fluid thereto for delivery to the inlet port and thereby to the cylinder, said fluid supply means including an annular wall spaced longitudinally opposite and radially outward of the inlet nozzles to define an annular chamber communicating with said nozzles, said chamber being connectable with a source of inlet fluid.

3. A flow directing inlet port for an internal combustion engine having a cylinder closed at one end, said port comprising a tubular wall defining an open passage of substantially circular cross section, devoid of sharp ends and extending at one end through said cylinder closed end to an annular valve seat, the other end of said passage being closed by an end wall, a poppet valve having a head seatable on the valve seat to close the passage against communication with the cylinder and a stem extending into the passage from the head and through one of said passage walls for reciprocably supporting the valve head for movement into open and closed positions, a plurality of inlet nozzles extending through the walls of said passage and comprising the sole means for conducting primary inlet fluid into said passage, said nozzles being directed generally tangentially of the interior of the tubular passage defining wall and offset at a predetermined lead angle toward the cylinder end of the passage with respect to planes normal to the passage axis so as to direct fluid flow into the passage in a helical flow pattern within the passage having a spiral lead angle substantially determined by the lead angle of the nozzles, all of said nozzles being offset longitudinally of the passage and so located as to direct flow into substantially the same helical path within the passage to define, supplement and reinforce a single lead pattern of helical flow in the passage having a predetermined primary flow path leading to discharge into the cylinder with a predetermined primary flow direction essentially circumferentially tangential to the cylinder wall determined by the primary flow path in the passage, and fluid supply means connecting with the nozzles to supply primary inlet fluid thereto for delivery to the inlet port and thereby to the cylinder, said fluid supply means including an annular wall spaced longitudinally opposite and radially outward of the inlet nozzles to define an annular chamber communicating with said nozzles, said chamber being connectable with a source of inlet fluid.

* * * * *